(12) United States Patent
Greenwood

(10) Patent No.: US 6,420,694 B1
(45) Date of Patent: Jul. 16, 2002

(54) STEERABLE RETROREFLECTIVE SYSTEM AND METHOD

(75) Inventor: Thomas A. Greenwood, Sumner, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/400,421

(22) Filed: Sep. 21, 1999

(51) Int. Cl.⁷ ................................................ G06M 7/00
(52) U.S. Cl. .................... 250/221; 250/222.1; 356/138; 359/152; 700/108
(58) Field of Search .............................. 250/203.4, 221, 250/222.1; 356/138, 139.03, 139.04, 139.06, 139.07, 141.2; 359/152, 159, 171, 168–170; 700/108–110, 114, 192, 193

(56) References Cited

U.S. PATENT DOCUMENTS

| | | |
|---|---|---|
| 4,209,689 A | 6/1980 | Linford et al. |
| 4,714,339 A | 12/1987 | Lau et al. |
| 4,895,440 A | 1/1990 | Cain et al. |
| 5,060,304 A | 10/1991 | Solinsky |
| 5,083,866 A | 1/1992 | Dey |
| 5,117,305 A | 5/1992 | Dey |
| 5,121,242 A | 6/1992 | Kennedy |
| 5,142,400 A | 8/1992 | Solinsky |
| 5,267,014 A | 11/1993 | Prenninger |
| 5,539,562 A | 7/1996 | Morioka et al. |
| 5,633,716 A | 5/1997 | Corby, Jr. |
| 5,719,670 A | 2/1998 | Duboz et al. |
| 5,903,459 A | 5/1999 | Greenwood et al. |

FOREIGN PATENT DOCUMENTS

DE    197 29 475 C    4/1998

OTHER PUBLICATIONS

K. Lau, R. Hocken and L. Haynes, Robot Performance Measurements Using Automatic Laser Tracking Techniques, *Robotics & Computer–Integrated Manufacturing*, 1985, pp. 227–236, vol. 2, No. 3/4., USA.

L.R. Rene Mayer and Graham A. Parker, A Portable Instrument For 3–D Dynamic Robot Measurements Using Triangulation And Laser Tracking, *IEEE Transactions On Robotics And Automation*, Aug. 1994, pp. 504–516, vol. 4, New York, USA.

*Primary Examiner*—Stephone Allen
(74) *Attorney, Agent, or Firm*—Alston & Bird LLP

(57) ABSTRACT

A steerable retroreflective system is disclosed that includes a retroreflector that reflects at least some light incident upon the retroreflector, while permitting at least some of the incident light to leak therethrough. The steerable retroreflective system also includes an optical detector that detects leakage light that passes through the retroreflector. The steerable retroreflective system further includes means for controllably steering the retroreflector in response to the leakage light detected by the optical detector, such as to track the incident light. The method of controllably steering the retroreflector is also disclosed. The steerable retroreflective system and method therefore provides a retroreflective target with a much wider acceptance angle than conventional retroreflective targets. As a result, the retroreflective target can continue to be illuminated by a laser tracker and can continue to provide information indicative of the position of the retroreflective target as a machine tool on which the retroreflective target is mounted is moved during machining operations.

13 Claims, 3 Drawing Sheets

STEERABLE RETROREFLECTIVE SYSTEM AND METHOD

FIELD OF THE INVENTION

The present invention relates generally to retroreflectors and, more particularly, to steerable retroreflectors and associated methods.

BACKGROUND OF THE INVENTION

Retroreflectors are utilized in a variety of applications that require light to be reflected toward its source. For example, retroreflectors can be utilized as targets that are illuminated by a laser source such that the location of the retroreflective target can be precisely determined by detecting and analyzing the reflected light. In three-dimensional metrology, for example, applications such as laser pointing, tracking interferometry and laser radar measurement systems utilize retroreflectors as targets. In this regard, retroreflective targets can be mounted on robots, machine tools or other mechanical positioning devices, including various types of computer numerical control (CNC) devices, (hereinafter collectively referred to as "machines") such that the position of a machine can be precisely determined by illuminating the retroreflective target and measuring the reflected light. In one advantageous example, a retroreflective target can be mounted upon the end effector of a robot such that the position of the end effector can be precisely determined.

Since the position of a retroreflective target can be precisely determined by illuminating the target, such as with a laser, and by thereafter detecting the light reflecting from the retroreflective target, retroreflective targets are advantageously employed during the manufacture of parts demanding high precision, such as parts fabricated for the aerospace and automobile industries. In this regard, retroreflective targets can be mounted upon machines, such as robots or other machine tools, utilized during the manufacture of precision parts such that the position of the machine can be precisely determined and any positional errors, such as positional errors due to changes in the temperature, misalignment or the like, can be detected and corrected. See, for example, U.S. Pat. No. 5,903,459 which issued May 11, 1999 to Thomas A. Greenwood et al. and which describes a precision measuring system and method, the contents of which are incorporated by reference herein.

While a retroreflector would ideally have an unlimited field of view such that the retroreflector could receive and reflect light that impinges upon the retroreflector from any direction, conventional retroreflectors have a limited field of view known as an acceptance angle. As such, light received by a retroreflector within the acceptance angle is reflected by the retroreflector. However, light outside of the acceptance angle is not reflected and, therefore, cannot be utilized to determine the position of the retroreflector. As such, the acceptance angle defined by a retroreflector restricts the position and orientation of the retroreflector relative to the light source. This limitation is particularly disadvantageous in applications in which the retroreflector is mounted upon a machine, such as a robot or other machine tool, that can move in multiple directions and about multiple axis relative to the light source and may frequently be positioned such that the retroreflector does not face the light source, thereby preventing the light emitted by the light source from falling within the acceptance angle defined by the retroreflector. Without adding additional light sources and/or additional retroreflectors which would, in turn, increase the cost and complexity of the precision measuring system, the position of the machine can therefore not be determined in instances in which the retroreflector does not face the light source.

One common retroreflector is a trihedral prism reflector that is frequently referred to as a solid corner cube retroreflector. The trihedral prism retroreflector has three mutually orthogonal surfaces such that light incident upon the prism is reflected generally parallel to, but laterally displaced from the incident light. While trihedral prisms are relatively inexpensive and are fairly accurate with the incident and reflected beams being parallel to within 2.0 microradians, the lateral displacement of the reflected beam from the incident beam varies due to refraction based upon the angle at which the incident light strikes the retroreflector, i.e., the incidence angle. In order to maintain accurate retroreflector properties, the trihedral prism retroreflector is therefore limited to an acceptance angle of about +/−15°.

Another type of retroreflector is a hollow corner cube retroreflector that is constructed of three mutually orthogonal mirrors. Although the lateral displacement between the incident and reflected beams does not vary as a function of the incidence angle, a hollow corner cube retroreflector is generally relatively difficult to manufacture and is accordingly more expensive than a comparable trihedral prism reflector. In addition, hollow corner cube retroreflectors typically have an acceptance angle of +/−25°.

The third type of retroreflector is a cat eye in which several hemispherical lenses are bonded to form a single optical element. While a cat eye has a larger acceptance angle, such as about +/−60°, a cat eye is significantly more expensive than a trihedral prism retroreflector or a hollow corner cube retroreflector. While a cat eye has a much greater acceptance angle than a trihedral prism retroreflector or a hollow corner cube retroreflector, the acceptance angle of a cat eye is still insufficient in many situations, particularly in many high precision manufacturing operations in which the retroreflector will be mounted upon the end effector of a robot or other machine tool that will assume many different positions during the manufacturing process.

One attempt to overcome the limited acceptance angles of conventional retroreflectors is to group a plurality of hollow corner cube retroreflectors in a cluster. Unfortunately, the clustered retroreflectors do not form a single, large, continuous acceptance angle. Instead, the clustered retroreflectors form a plurality of distinct acceptance angles with gaps between each acceptance angle. As such, certain angular regions still do not fall within the acceptance angle of any of the clustered retroreflectors. In addition, clustered retroreflectors have not been able to be constructed so as to simulate a single target since the retroreflectors have not been able to be positioned such that their apexes are coincident.

Accordingly, although a variety of retroreflectors are available, these conventional retroreflectors do not define acceptance angles that are sufficiently large and continuous as required by some applications. In this regard, retroreflectors that are mounted upon the end effector of a robot or other machine tool preferably have an extremely large acceptance angle since the retroreflectors will be moved through a wide range of positions during typical machining operations. As such, there remains a need for a retroreflector having a much larger acceptance angle than conventional retroreflectors, while still being capable of being economically manufactured and deployed.

SUMMARY OF THE INVENTION

A steerable retroreflective system and method is therefore provided which has a retroreflector with an extremely large effective acceptance angle, typically exceeding 320°. The area outside the acceptance is therefore a conic subtending an angle that is generally less than 40°. As such, the retroreflector of the steerable retroreflective system of the present invention can be mounted upon a machine, such as the end effector of a robot or other machine tool, and can be controllably steered such that the incident light remains within the acceptance angle of the retroreflector even as the machine is moved through a wide range of positions and orientations. Thus, the position of the machine can continue to be monitored based upon the light reflected by the retroreflector of the present invention.

According to the present invention, the retroreflector is designed to reflect the majority of the incident light while permitting some of the incident light to pass or leak therethrough. The steerable retroreflective system also preferably includes an optical detector for detecting the leakage light that passes through the retroreflector and means for controllably steering the retroreflector in response to the leakage light detected by the optical detector. The means for controllably steering the retroreflector preferably includes at least one positioner for moving the retroreflector and a controller, responsive to the optical detector, for directing the at least one positioner to controllably steer the retroreflector in response to the leakage light detected by the optical detector. For example, the controller can continuously steer the retroreflector to follow the incident light. Although the optical detector and the controller can cooperate to steer the retroreflector according to a variety of techniques, the optical detector of one embodiment defines a target zone and the controller steers the retroreflector so as to move the leakage light toward the target zone.

In advantageous embodiment, the retroreflector is a trihedral prism having an input surface through which incident light is received and a plurality of reflective surfaces for reflecting the incident light. The trihedral prism also defines an at least partially transmissive window opposite the input surface such that leakage light passes through the window and escapes from the trihedral prism. The edges of the reflective surfaces of the trihedral prism define lines that intersect at an imaginary apex of the trihedral prism. Preferably, the window is offset from the imaginary apex of the trihedral prism and is sized such that between about 0.5% and 5% of the light received through the input surface of the trihedral prism passes through the window. More preferably, the window is sized such that about 1% of the light received through the input surface of the trihedral prism passes through the window.

In operation, the retroreflector is illuminated by light incident thereupon. By detecting the leakage light that passes through the retroreflector, the retroreflector can be controllably steered, such as to lock onto and follow the incident light. By controllably steering the retroreflector, the retroreflector effectively has an extremely large acceptance angle. For example, the retroreflector can have an acceptance angle of about 320°, so as to permit light to be received and reflected by the retroreflector from a much wider range of angles than conventional retroreflectors. As a result of the significantly increased acceptance angle, the steerable retroreflective system is particularly advantageous for use with machines, such as robots and other machine tools, that are capable of assuming a variety of positions. In this regard, by having a large acceptance angle, the steerable retroreflective system of the present invention permits the retroreflector to be illuminated in almost every position that the machine assumes, while maintaining a common apex location.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
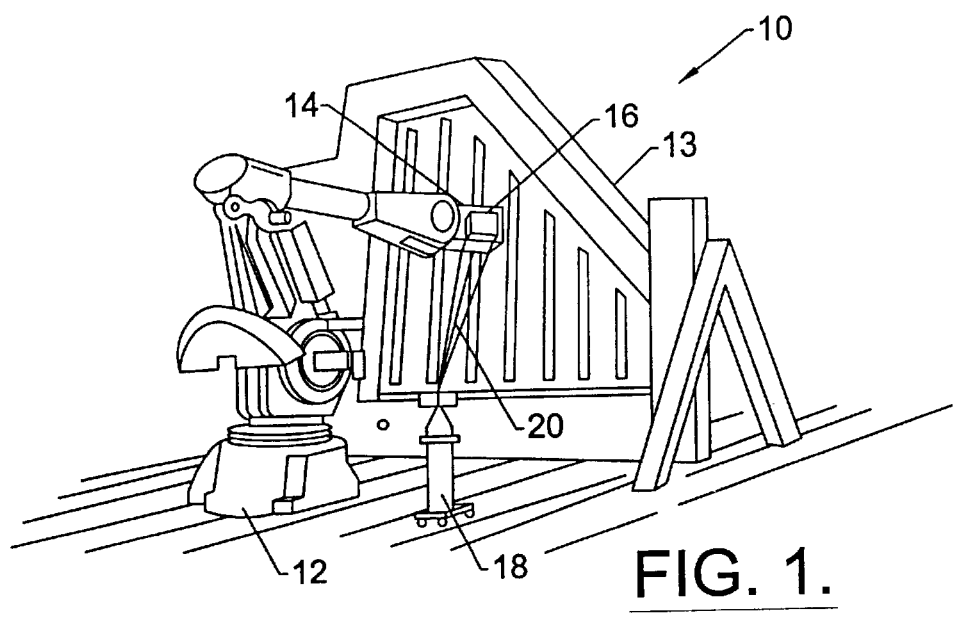
FIG. 1 is a schematic representation of a machine system that includes a steerable retroreflective system according to one embodiment of the present invention.

Referring now to FIG. 1, a machine system 10 that includes a steerable retroreflective system 16 according to the present invention is depicted. As shown somewhat generically in FIG. 1, the machine system includes a machine 12, such as a robot, a machine tool or other mechanical positioning device. For example, the machine can be a CNC device, such as a robotic drilling machine or the like. For purposes of illustration, however, the machine is depicted relatively generically and is capable of movement in multiple directions and about multiple axis, i.e., the machine has multiple degrees of freedom. Although not necessary for the practice of the present invention, the machine includes an end effector 14 for holding a tool, such as a drill bit or the like. Although the steerable retroreflective system of the present invention can be employed in conjunction with various machine systems, one exemplary precision machine system with which the steerable retroreflective system can be utilized is the SOMaC system as described by U.S. Pat. No. 5,903,459, the contents of which have been incorporated herein. See also U.S. patent application serial No. 08/867,857, filed Jun. 3, 1997 by Thomas A. Greenwood, et al., the contents of which are also hereby incorporated by reference.

As also shown in FIG. 1, the steerable retroreflective system 16 of the present invention is mounted upon the end effector 14 of the machine. However, the steerable retroreflective system of the present invention can be mounted upon other portions of the machine 12 or upon the part 13 to be machined without departing from the spirit and scope of the present invention. See, for example, the machine system described in co-pending U.S. patent application Serial No. 09/400,422 entitled "Machine System Having Optical Endpoint Control and Associated Method" filed concurrently herewith that includes a steerable retroreflective system of the present invention, the contents of which are also incorporated herein.

The machine system 10 of FIG. 1 also includes at least one laser measurement system 18, i.e., laser tracker, for illuminating the steerable retroreflective system 16. Real time three dimensional laser measurement systems are state of the art measurement systems that obtain large quantities of accurate three dimensional data in a rapid fashion. These laser measurement systems typically include an absolute ranging capability and a motorized angle steering head to steer the laser beam. A laser measurement system also includes a feedback system that controls the steering by continually driving the laser beam to follow or track the retroreflector. As shown in FIG. 1, the laser beam 20 emitted by the laser measurement system is directed from the laser tracker head to the steerable retroreflective system 16 mounted on the end effector 14 of the machine 12. By measuring the return beam, the laser tracker head of the laser measurement system can determine both the distance and the direction to the retroreflector, i.e., both the horizontal and vertical angles, as well as the range. These three measurements, i.e., range, horizontal angle and vertical angle, establish a spherical coordinate system that can be easily transformed into a Cartesian coordinate system. A variety of commercially available or custom built laser trackers can be employed. Additional details regarding laser tracking systems are provided by U.S. Pat. No. 5,903,459, the contents of which have been incorporated by reference herein.

During a machining operation, a part 13 is held in a fixed position, as shown in FIG. 1. A machine 12 is then positioned proximate the part such that the tool carried by the end effector 14 can contact and machine the part, as desired. In order to precisely determine the position of the end effector, the laser tracker 18 will illuminate the end effector and, in particular, the steerable retroreflective system 16 carried by the end effector. As will be apparent, the machine will frequently reposition the end effector during the machining process. In conventional machine systems that included a retroreflector mounted upon an end effector, the end effector would frequently be moved such that the laser beam 20 would no longer be within the acceptance angle defined by the retroreflector. According to the present invention, however, the steerable retroreflective system is provided that may be mounted upon the end effector and steered through a wide range of angles, thereby providing a much larger effective acceptance angle than conventional retroreflectors. For example, the steerable retroreflective system of the one embodiment of the present invention has an acceptance angle of about 320° or more. As such, the steerable retroreflective system can continue to receive the laser beam emitted by the laser tracker even as the end effector is moved into various positions. Accordingly, the machine system 10 of FIG. 1 can determine the position of the retroreflector and, in turn, the position of the end effector in almost all of the positions that the end effector will assume.

Figure 2:
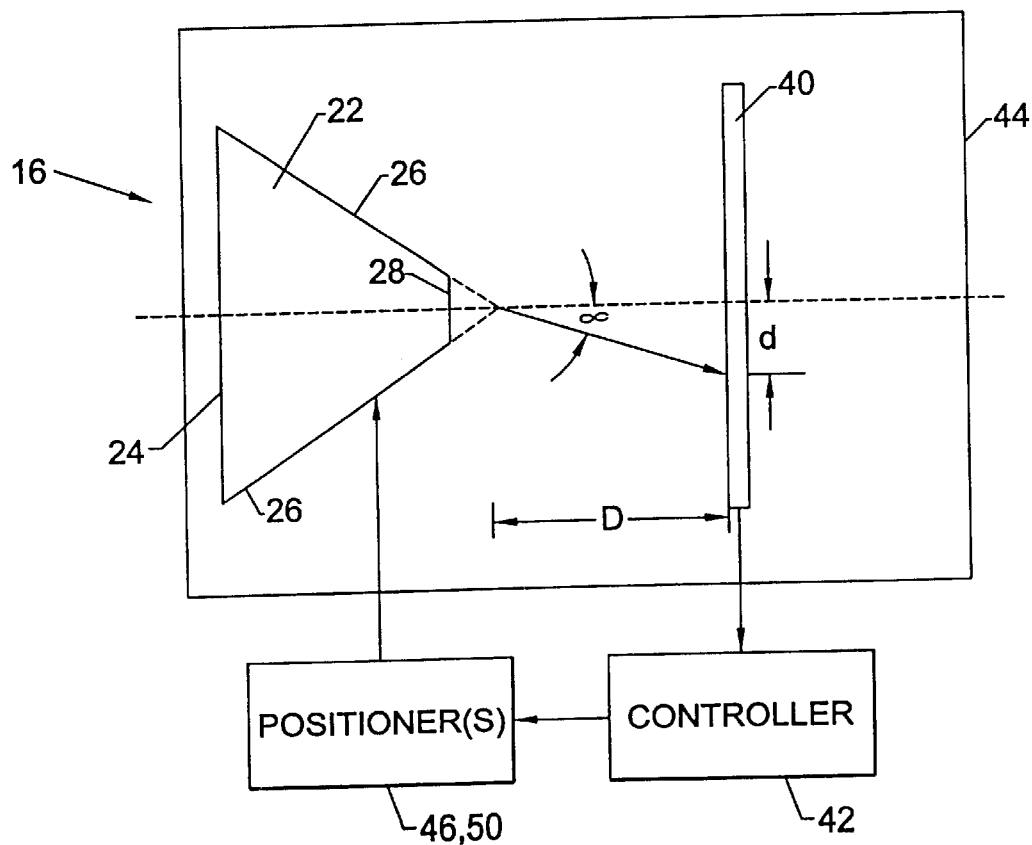
FIG. 2 is a schematic representation of a steerable retroreflective system according to one embodiment of the present invention.

As shown in more detail in FIG. 2, the steerable retroreflective system 16 includes a retroreflector 22 for reflecting at least some of the light that is incident thereupon. In one advantageous embodiment, the retroreflector is a trihedral prism having an input surface 24 through which incident light is received and the plurality of reflective surfaces 26 for reflecting the incident light. As known to those skilled in the art, the reflective surfaces are generally mirrored to facilitate reflection of the incident light. According to the present invention, the retroreflector is designed to permit a portion of the incident light to escape from the retroreflector without being reflected thereby. As shown in FIG. 2, for example, the trihedral prism defines a window 28 opposite the input surface such that the plurality of reflective surfaces converge at the window. The window is at least partially transmissive such that light incident upon the window passes therethrough and escapes from the trihedral prism. In order to permit the light to leak through the window, the window is preferably free of any mirrored coating.

For a window of a given transmissivity, the percentage of the incident light that is allowed to leak through the window 28 is defined by the size of the window relative to the input surface 24 of the trihedral prism. In one embodiment, the window is sized such that between about 0.5% and 5% of the light received through the input surface of the trihedral prism passes through the window. More preferably, the window is sized such that about 1% of the light received through the input surface of the trihedral prism passes through the window.

Figure 3:
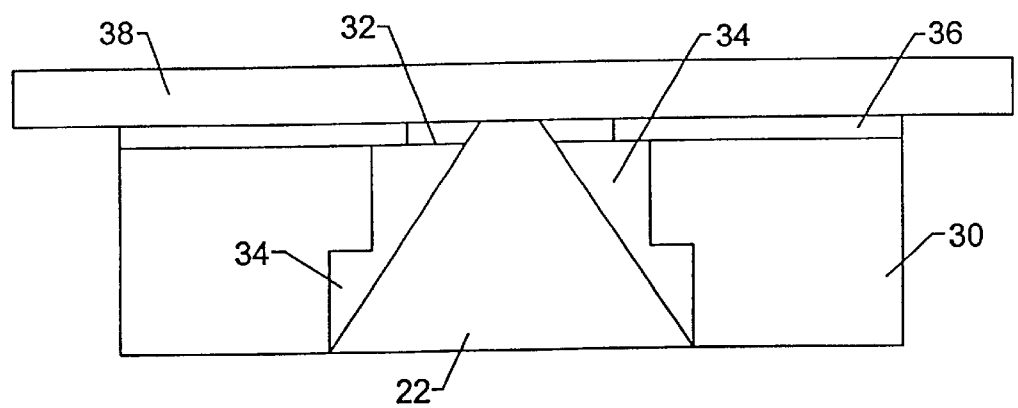
FIG. 3 is a side view illustrating one technique for fabricating a retroreflector of a steerable retroreflective system according to one embodiment of the present invention.

The retroreflector 22 can be constructed so as to permit a predetermined percentage of the incident light to leak therethrough in a variety of manners. According to one advantageous embodiment, however, the apex of a trihedral prism is truncated or removed. See, for example, FIG. 2 in which the truncated apex is depicted in dashed lines. In order to fabricate the prism with a truncated apex, the trihedral prism can be secured within a mount 30 such that the apex of the prism protrudes through an aperture 32 defined by one surface of the mount, as shown in FIG. 3. For example, the trihedral prism can be secured within an aluminum mount by means of an epoxy 34 formed of 50% beeswax and 50% treepitch. In order to protect the trihedral prism during the grinding process, a sacrificial glass layer 36 that also defines an aperture in a medial portion thereof can be secured to the surface of the mount through which the apex of the prism protrudes such that the apertures defined by the mount and the sacrificial glass layer are aligned. The apex of the prism and the sacrificial glass layers are then ground with a grinding instrument or pad 38 until a window of a predetermined size has been defined.

As shown in FIG. 2, the steerable retroreflective system 16 also includes an optical detector 40, such as a photocell, for detecting the leakage light that passes through the retroreflector 22. As described below, the optical detector detects the relative position of the leakage light such that the incidence angle cc can be determined. The steerable retroreflective system also preferably includes a controller 42, such as a microprocessor or the like, for receiving signals from the optical detector and for determining the incidence angle. In this regard, the controller can determine the incidence angle $\alpha$ by the following equation: $\alpha = \tan^{-1}(d/D)$ wherein D is the predetermined separation distance between the optical detector and the virtual apex of the retroreflector and d is the offset of the leakage light that passes through the retroreflector from the center or other reference location defined by the optical detector.

Figure 4:
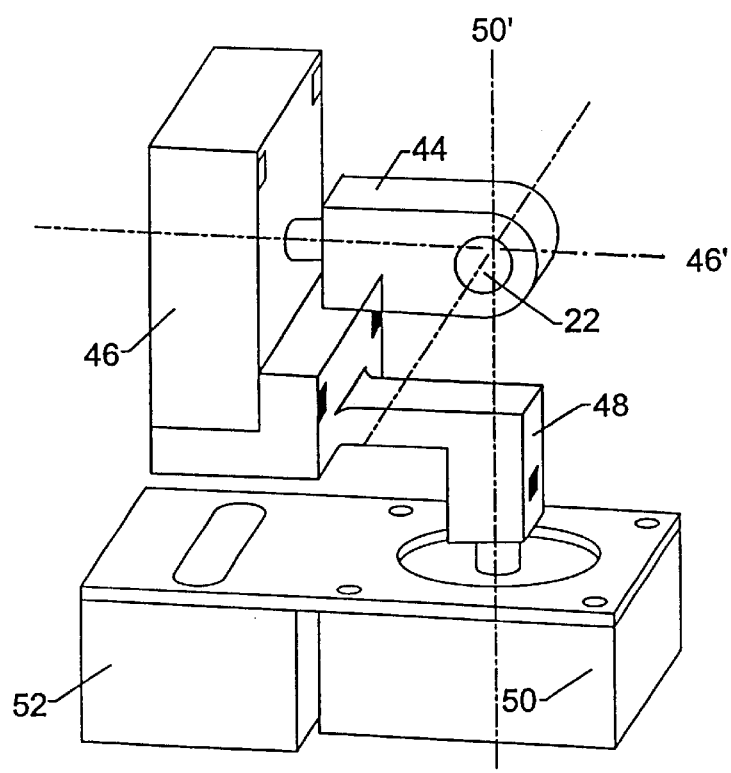
FIG. 4 is a perspective view of a steerable retroreflective system according to one embodiment of the present invention.

As shown in FIG. 4, the retroreflector 22 and the optical detector 40 are typically mounted within a housing 44. The housing, in turn, is mounted to the object to be monitored, such as the end effector 14 of a machine 12, so as to move therewith. As described below, however, the retroreflector can also be controllably positioned relative to the object to be monitored. In this regard, the steerable retroreflective system 16 includes means for controllably steering the retroreflector in response to the leakage light detected by the optical detector. In one advantageous embodiment, the means for controllably steering the retroreflector includes at least one positioner for moving the retroreflector and a controller 42, such as the microprocessor described above, that directs the at least one positioner to controllably steer the retroreflector in response to the leakage light detected by the optical detector.

As shown in FIG. 4, for example, the at least one positioner can include first and second motors for moving the retroreflector 22 about respective axes. In this regard, the means for controllably steering the retroreflector can include a first motor 46, such as a first stepper motor, having a shaft connected to the housing 44 in which the retroreflector and the optical detector are disposed. As such, the controller 42 can actuate the first motor so as to rotate the shaft and, in turn, rotate the retroreflector about the axis 46' defined by the shaft. As shown in FIG. 4, the first motor can be mounted in a first motor mount 48. In addition, the means for controllably steering the retroreflector can include a second motor 50, such as a second stepper motor, having a shaft connected to the first motor mount. As such, the controller can actuate the second motor so as to rotate the shaft and, in turn, the first motor mount, the first motor and the housing that includes the retroreflector and the optical detector since each of these components is connected to the shaft of the second motor. In particular, the second motor rotates the first motor mount, the first motor and the housing about the axis 50' defined by the shaft of the second motor. Preferably, the axes defined by the shafts of the first and second motors intersect at the apex of the retroreflector such that the apex of the retroreflector remains in the same position and the remainder of the retroreflector is pivoted thereabout upon actuation of the first and/or second motors. As also shown in FIG. 4, the second motor is typically mounted to a second motor mount 52 which, in turn, is fixed to the object to be monitored, such as the end effector 14 of a machine 12 shown schematically in FIG. 1. As such, the controlled actuation of the first and second motors can controllably steer the retroreflector relative to the object upon which the steerable retroreflective system mounted.

Although not depicted in FIG. 4, the controller 42 is preferably in electrical communication with each of the first and second stepper motors 46, 50 so as to controllably actuate the first and second stepper motors. In addition, although the means for controllably steering the retroreflector 22 according to one advantageous embodiment is depicted in FIG. 4, the steerable retroreflective system 16 can include other means for controllably steering the retroreflector without departing from the spirit and scope of the present invention.

Figure 5:
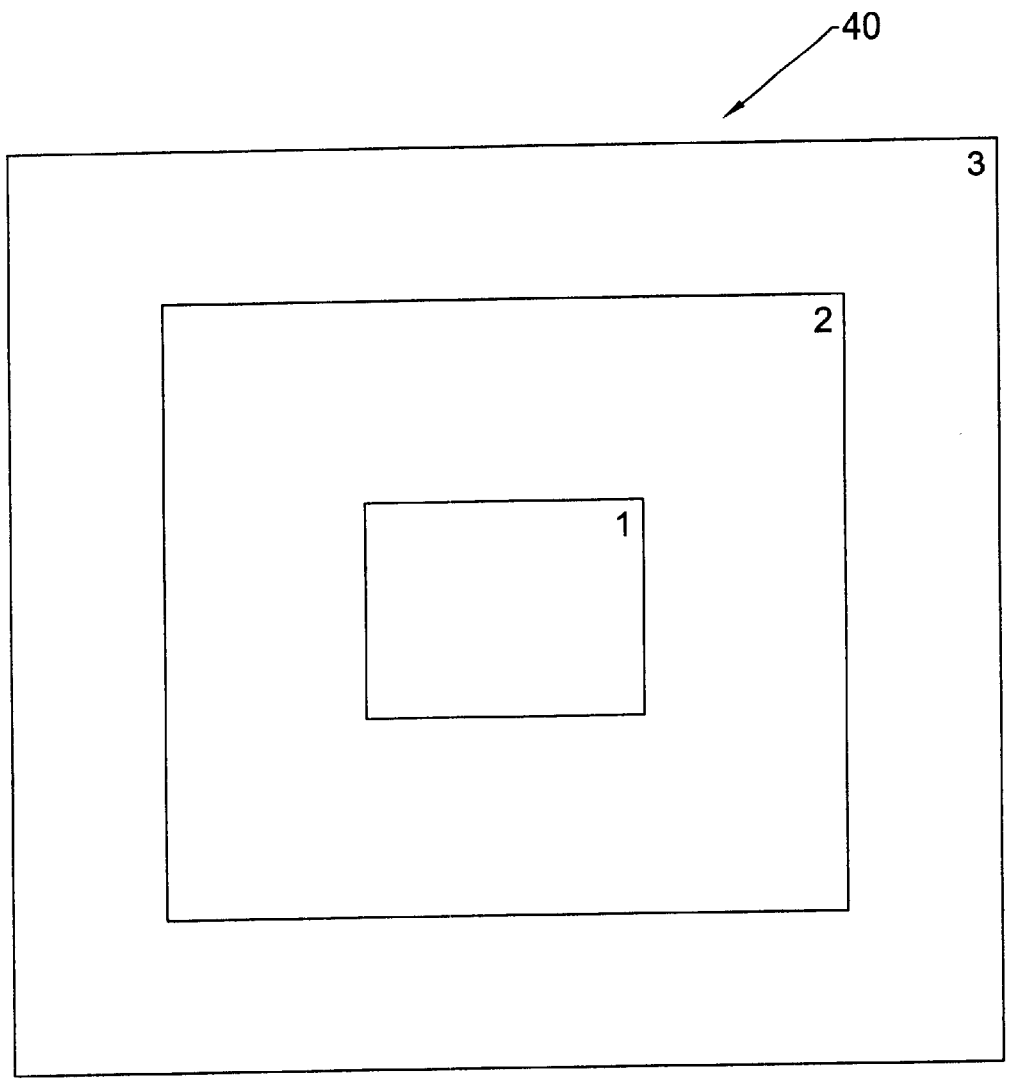
FIG. 5 is a schematic view of an optical detector of a steerable retroreflective system according to one embodiment of the present invention which illustrates the different zones defined by the optical detector.

The retroreflector 22 can be steered in any manner desired by the operator of the machine system 10. For example, the retroreflector can be steered in an open loop fashion through a sequence of positions, each of which are defined in advance. Alternatively, the retroreflector can be steered by the controller 42 in a closed loop fashion so as to follow or track the incident light. In this respect, the steerable retroreflective system 16 can track the incident light in a variety of fashions. In one embodiment, for example, the optical detector 40 defines a target zone and the controller steers the retroreflector to maintain the leakage light within the target zone. By maintaining the leakage light within the target zone, the controller also will steer the retroreflector to follow the incident light. By way of example, the optical detector depicted in FIG. 5 is divided into three zones designated 1, 2, and 3. Although the optical detector of FIG. 5 is divided into square zones, the zones can have any shape desired for a particular application, such as circular, without departing from the spirit and scope of the present invention. In this embodiment, however, the leakage light is preferably maintained within zone 2, i.e., the target zone. As such, the controller will steer the retroreflector in instances in which leakage light is detected in either zone 1 or zone 3 so as to move the leakage light into zone 2. Although the controller can implement various control techniques in order to analyze the output of the optical detector and, in turn, instruct the first and second motors 46, 50 so as to appropriately position the retroreflector, the controller of one advantageous embodiment employs a fuzzy logic technique, while the controller of another embodiment employs a proportional integral differential technique.

By controllably steering the retroreflector 22 such that the retroreflector follows or tracks the incident light, the retroreflector can continue to receive and reflect light from the laser tracker 18 even as the machine 12 upon which the retroreflector is mounted moves during machining operations. For example, the steerable retroreflective system 16 of one advantageous embodiment has been found to have an effective acceptance angle of 320°, an acceptance angle much larger than those provided by conventional retroreflectors. As such, the machine system 10 can continue to identify the precise position of the end effector 14 and, in turn, the tool held by the end effector during machining operations since the light emitted by the laser tracker will almost always fall within the acceptance angle defined by the retroreflector. In addition, the steerable retroreflective system can be utilized in a static mode to determine the current position of a machine or in a dynamic mode to determine the path along which the machine is moving. See, for example, the machine system described in co-pending U.S. patent application Serial No. 09/400,422 entitled "Machine System Having Optical Endpoint Control and Associated Method" filed concurrently herewith, the contents of which have also been incorporated herein.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A steerable retroreflective system comprising:
   a retroreflector for reflecting at least some light incident thereupon;
   an optical detector for detecting leakage light that passes through said retroreflector, wherein said optical detector defines a target zone; and
   means for controllably steering said retroreflector in response to the leakage light detected by said optical detector, wherein said means for controllably steering said retroreflector comprises:
      at least one positioner for moving said retroreflector; and
      a controller, responsive to said optical detector, for directing said at least one positioner to controllably steer said retroreflector to follow the incident light in response to the leakage light detected by said optical detector, wherein said controller steers said retroreflector to move the leakage light toward the target zone.

2. A steerable retroreflective system according to claim 1, wherein said at least one positioner comprises a plurality of motors for moving said retroreflector about respective axes.

3. A steerable retroreflective system comprising:
   a retroreflector for reflecting at least some light incident thereupon, wherein said retroreflector comprises a trihedral prism having an input surface through which incident light is received and a plurality of reflective surfaces for reflecting the incident light, wherein said trihedral prism defines an at least partially transmissive window opposite the input surface such that leakage light passes through said window and escapes from said trihedral prism, wherein edges of said reflective surfaces define lines that intersect at an imaginary apex of said trihedral prism, and wherein said window is offset from the imaginary apex of said trihedral prism and is sized such that between about 0.5% and 5% of the light received through said input surface of said trihedral prism passes through said window;

an optical detector for detecting leakage light that passes through said retroreflector; and means for controllably steering said retroreflector in response to the leakage light detected by said optical detector, wherein said means for controllably steering said retroreflector comprises:
  at least one positioner for moving said retroreflector; and
  a controller, responsive to said optical detector, for directing said at least one positioner to controllably steer said retroreflector in response to the leakage light detected by said optical detector.

4. A steerable retroreflective system comprising:

a trihedral prism having an input surface through which incident light is received and a plurality of reflective surfaces for reflecting the incident light, wherein said trihedral prism defines a window opposite the input surface such that said plurality of reflective surfaces converge at said window, said window being at least partially transmissive such that leakage light passes through said window and escapes from said trihedral prism;

an optical detector for detecting leakage light that passes through said trihedral prism;

at least one positioner for moving said trihedral prism; and a controller, responsive to said optical detector, for directing said at least one positioner to controllably steer said trihedral prism in response to the leakage light detected by said optical detector.

5. A steerable retroreflective system comprising:

a trihedral prism having an input surface through which incident light is received and a plurality of reflective surfaces for reflecting the incident light, wherein said trihedral prism defines a window opposite the input surface such that said plurality of reflective surfaces converge at said window, said window being at least partially transmissive such that leakage light passes through said window and escapes from said trihedral prism wherein edges of said reflective surfaces define lines that intersect at an imaginary apex of said trihedral prism, and wherein said window is offset from the imaginary apex of said trihedral prism;

an optical detector for detecting leakage light that passes through said trihedral prism;

at least one positioner for moving said trihedral prism; and a controller, responsive to said optical detector, for directing said at least one positioner to controllably steer said trihedral prism in response to the leakage light detected by said optical detector.

6. A steerable retroreflective system according to claim 5, wherein said reflective surfaces are mirrored, and wherein the window is free of any mirrored coating.

7. A steerable retroreflective system according to claim 5, wherein said window is sized such that between about 0.5% and 5% of the light received through said input surface of said trihedral prism passes through said window.

8. A steerable retroreflective system according to claim 7, wherein said window is sized such that about 1% of the light received through said input surface of said trihedral prism passes through said window.

9. A steerable retroreflective system according to claim 5, wherein said at least one positioner comprises a plurality of motors for moving said trihedral prism about respective axes.

10. A steerable retroreflective system according to claim 5, wherein said controller steers said trihedral prism to follow the incident light.

11. A method of controllably steering a retroreflector comprising:

illuminating the retroreflector with light incident thereupon, wherein the retroreflector comprises a trihedral prism having an input surface through which the incident light is received and a plurality of reflective surfaces for reflecting the incident light, wherein the trihedral prism defines a window opposite the input surface such that the plurality of reflective surfaces converge at the window, the window being at least partially transmissive such that leakage light passes through the window and escapes from the trihedral prism, wherein edges of the reflective surfaces define lines that intersect at an imaginary apex of said trihedral prism, and wherein the window is offset from the imaginary apex of the trihedral prism;

detecting the leakage light that passes through the window of the retroreflector; and controllably steering the retroreflector in response to the detected leakage light, wherein controllably steering the retroreflector comprises controllably steering the retroreflector to follow the incident light.

12. A method of according to claim 11, wherein controllably steering the retroreflector comprises controllably steering the retroreflector in each of a plurality of directions.

13. A method according to claim 11 further comprising allowing between about 0.5% and 5% of the light illuminating the retroreflector to leak therethrough and be detected.

* * * * *